Figure 1:
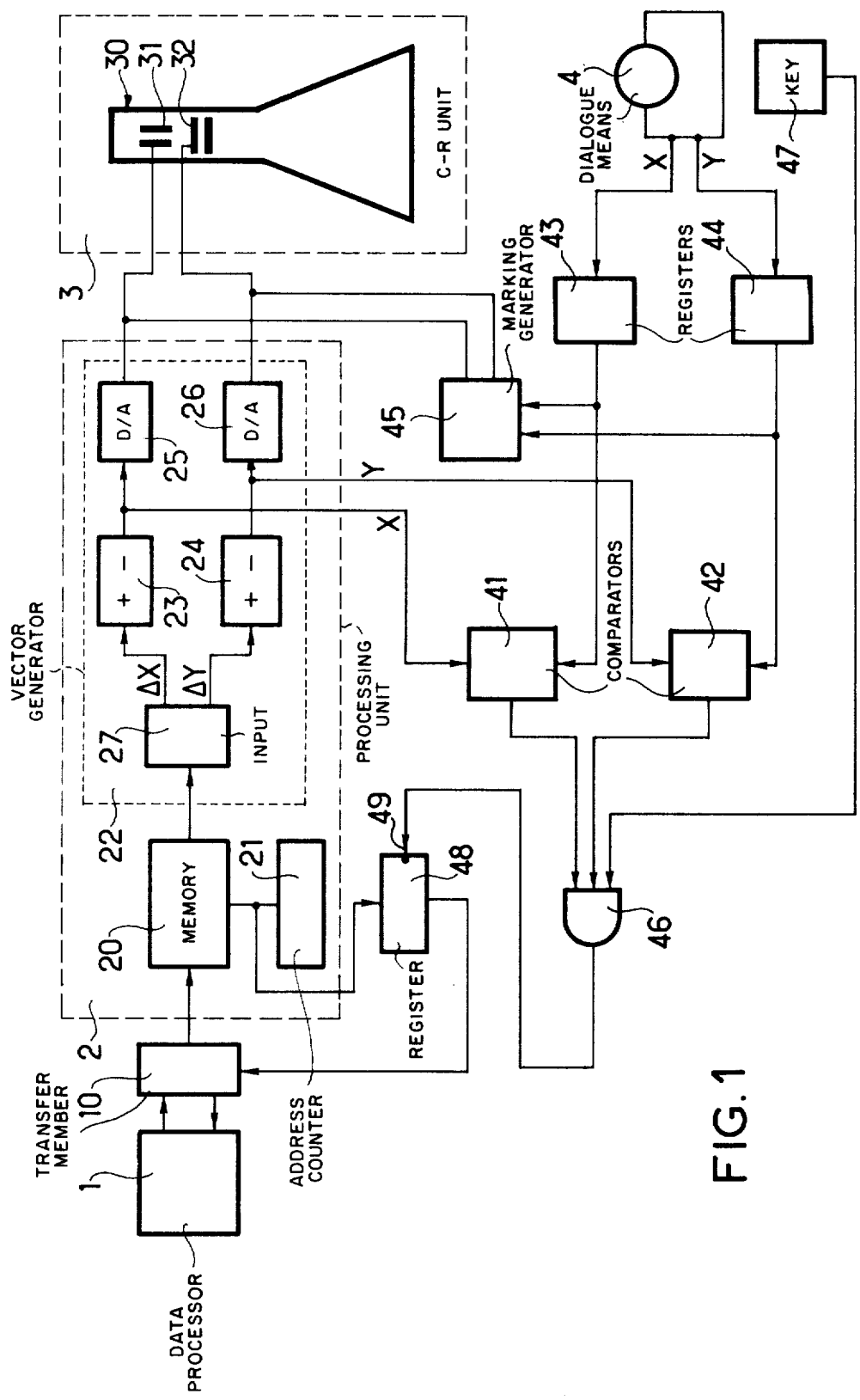

United States Patent [19]

Sinobad

[11] 3,996,582
[45] Dec. 7, 1976

[54] DEVICE FOR THE DESIGNATION OF AN IMAGE

[75] Inventor: Dusan Sinobad, Orsay, France

[73] Assignee: Compagnie Industrielle des Telecommunications Cit-Alcatel, Paris, France

[22] Filed: July 2, 1975

[21] Appl. No.: 592,776

[30] Foreign Application Priority Data

July 8, 1974 France .................. 74.23645

[52] U.S. Cl. .................. 340/324 A; 315/367; 340/172.5
[51] Int. Cl.² .................. G06F 3/14
[58] Field of Search .......... 340/324 A, 324 AD; 445/1; 315/367

[56] References Cited

UNITED STATES PATENTS

| | | | |
|---|---|---|---|
| 2,847,661 | 8/1958 | Althouse | 340/324 AD |
| 3,317,783 | 5/1967 | Neumeister | 340/324 A |
| 3,541,521 | 11/1970 | Koster | 340/172.5 |
| 3,541,541 | 11/1970 | Engelbart | 340/324 A |
| 3,581,290 | 5/1971 | Sugarman | 340/172.5 |
| 3,835,464 | 9/1974 | Rider | 340/324 A |

*Primary Examiner*—David L. Trafton
*Attorney, Agent, or Firm*—Haseltine, Lake & Waters

[57] ABSTRACT

The invention relates to a device for designating an element of an image in a display assembly. The device comprises a system providing the coordinates of a marked element of the displayed image, comparator receiving the coordinates of the marked element and receiving from a vector generator the moving coordinates of successive elements of the image while refreshed, and a register controlled for load by simultaneous coincidence the two pairs of coordinates for receiving the address of the marked element from an address counter associated with a memory recording the data that define the image. The invention also relates to an assembly for displaying information from a data processor on a scanned display screen.

2 Claims, 2 Drawing Figures

DEVICE FOR THE DESIGNATION OF AN IMAGE

The present invention relates to graphic visualisation assemblies permitting the representation of an image on the screen of a cathode ray tube in response to corresponding information received from a pilot data processing apparatus. More particularly, it relates to the dialogue means between an operator and the data processor in visualisation assemblies.

As is known, a visualisation assembly consists quite generally of a processing unit and a cathode ray tube unit. The chief function of the processing unit is to convert the digital signals coming from the data processing apparatus into voltages suitable for operating the cathode ray unit. The cathode ray unit enables the image which is formed to be displayed on its screen, and The image displayed on the screen must be renewed in order to ensure its permanency. One solution consists in repeating the information supplied by the data processor. This solution necessitating as it does a permanent flow of information from the data processor is not used in practice. As a substitute for this solution, a memory store is provided in the processing unit for preserving the information which nevertheless enables the data processor only to transmit information when it is necessary to change the image.

It is likewise known in connection with visualisation or display assemblies, that the dialogue means between the operator and the data processor, such as those known as "rolling ball", are adapted to provide a couple of analogue or numerical values translating the X and Y coordinates into a system of rectangular axes defined on the screen, of an element of the displayed image.

For example, the "rolling ball" intended to provide the X and Y coordinates fed to the data processor is utilised to generate afterwards a marker appearing on the screen. In order to determine the coordinates of an element of an image displayed on the screen, the operator moves the marker up to the element in question; the orientation of the element coordinate-wise is thereupon effected by the data processor.

In one method of carrying this into effect, the "rolling ball" is of the optoelectronic type. The "rolling ball" of this type comprises two discs which rotate while the ball is moved across the screen, each disc including near its edge, a series of apertures on either side of which are mounted a light source and a phototransistor. The phototransistor associated with one of the discs yields a digital representation of the displacement parallel to X of the "rolling ball", while the other yields a representation of its displacement parallel to Y. This device therefore enables the coordinates X and Y to be determined of a data mark on the screen.

In another method, the "rolling ball" is of the ohmic type. It comprises two potentiometers over which cursors are moved as equivalents of the perforated discs associated with the light sources and phototransistors. In this case, the potentiometers provides voltages representing the coordinates X and Y of a datum mark on the screen.

Other dialogue means, although based on different technology, resemble the "rolling ball" in being generators of coordinates of points on the screen of a display assembly.

The markers generated, based on these dialogue means which forms generators of coordinates of an element of an image displayed on the screen, are adapted to serve particularly for the production of a novel form of graphics on the display screen.

The markers may equally well be used for the designation of the indicated element. The coordinates X and Y which are available from the coordinate generator enable, as least in theory, the element whose position it is desired to mark, to be retrieved in the data processor. However, it is often much more convenient to have available the address of this element rather than the coordinates thereof, which are not known with any accuracy in the programme of the data processor and compel the user or operator to calculate them. In face there exists a direct relation between the address of each of the elements constituting the image and the data relating to each one of said elements, in the data processor which pilots the representation of the image to be displayed. This data will correspond to the coordinates of each of the elements although said coordinates are not explicitly known in the data processor.

The object of the present invention is to obtain the address of a given element from the coordinates of said element provided by a dialogue means of the coordinate generator type.

One of the subjects of the present invention is a device for designating an element of an image in a display assembly piloted by a data processor receiving information relating to the image and composed of a processing unit and a cathode ray unit adapted to convert the digital signals received from said processor into suitable analogue voltages for displaying the image. The unit is equipped with an image memory, an address counter for information recorded in the memory and a vector generator controlled by the same.

According to the invention, the device is characterised in that it comprises a dialogue means between an operator and the data processor furnishing the X and Y coordinates of a datum-marked element of the displayed image, first and second comparators each receiving respectively, on the one hand, the X and Y coordinates defined by the dialogue means, of the datum-marked element and, on the other hand, the current coordinates of the successive elements of the image, obtained from the vector generator, so as to detect the coincidence thereof, and a register connected to the output of the address counter associated with the memory and controlled for load by simultaneous coincidences, detected by the comparators, between the two pairs of coordinates which they receive.

Another object of the present invention is an assembly for displaying information from a data processor on a scanned display screen and having an interface for designating an element of the displayed image, comprising a digital processing unit having a memory for storing information relating to the image to be displayed, an address counter for the information recorded in the memory, and a scan control circuit having outputs for controlling the scanning of the screen in dependence upon the stored information, wherein the interfaces are operative to produce signals representative of the coordinates of an element designated by an operator, the assembly further comprising compactor means for detecting coincidence between the coordinates and the outputs of the scan control circuit and a register for storing the address in the address counter at the time when coincidence is detected by the comparator means.

Figure 2:
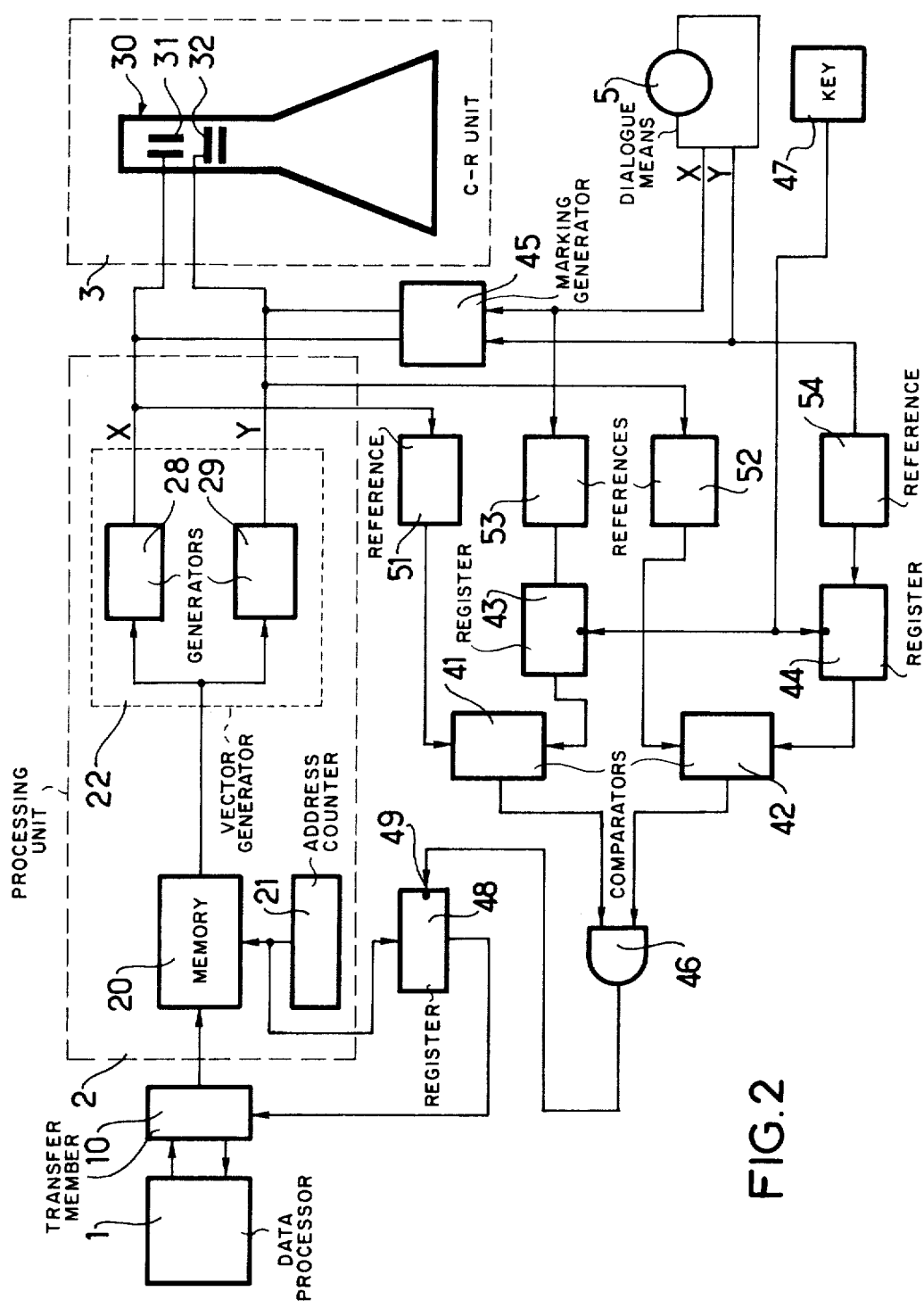

Other characteristic features and the advantages of the present invention will be apparent from the following description of the attached drawings in which:

FIGS. 1 and 2 show two different exemplary embodiments of the device according to the invention.

Referring to FIG. 1, this shows the device for designating an element of an image functioning from a dialogue means producing the coordinates of the element of an image in digital form and starting from the display assembly plotting successive elements of the image whose coordinates are furnished in digital form.

In FIG. 1 moreover, there is shown a display assembly piloted by a data processor 1, which having received the information relative to the image to be depicted has passed it on in digital form. The display assembly consists of a processing unit 2 receiving the information from the data processor 1 and a cathode ray unit 3 for displaying the image. The processing unit 2 is responsible for converting the information received from the data processor into analogue voltages suitable for controlling the respective horizontal and vertical deflections of the cathode ray unit, for the graphical display of the image on the screen. The cathode ray unit is connected to the data processor 1 through a transfer member 10 controlling the transfer of information from the processor 1; this transfer member likewise serves to transmit instructions or information to the processor 1.

The processing unit 2 comprises mainly, as is shown, a memory 20, an address counter 21 linked to the memory and a vector generator 22.

The memory 20 records the information from the processor 1 relating to the image, it also enables the image to persist by renewals of said image without having to supply information continually from the data processor. In the memory 20, the information consists of the coordinates X and Y of the successive elements to be plotted, or more generally of the lengths of the projections ΔX and ΔY of the elements to be plotted in succession, these coordinates or projections ΔX and Δy are given with reference to a system of rectangular axes as viewed on the screen.

The information appearing at the memory outlet and giving an element which is being plotted is indexed by its address in the data processor, this address is likewise defined in the address counter 21. The vector generator 22 includes two paths, one handling the information ΔX and the other the information ΔY from the memory 20 so as to enable the corresponding element to be plotted. The generator includes in each path an adder-subtracter 23 or 24, and a digital-analogue converter 25 or 26, followed by a deflection amplifier (not shown). The digital values, coded in the binary mode, of the projections ΔX and Δy of the element being plotted are supplied to an input stage 27 receiving clock pulses H controlling the speed of the plot.

The input stage 27 detects the number of elemental programme steps $x$ and $y$, of predefined length, contained in the projections ΔX and ΔY and establishes the relation between them. The input stages 27 acts as a binary frequency multiplier, it therefore supplies to the adder-subtracters 23 and 24, during the plotting of the element, a number of pulses H equal to the number of programme steps $x$ and $y$, these pulses H being uniformly distributed during the plot having regard to the relation of the number of the programme steps $x$ and $y$. Obviously, these adder-subtracters are controlled in their adding and subtracting functions by the sign of each of the projections X and Y.

The cathode ray unit 3 consists of a cathode ray tube 30. In this case there have merely been shown the means for deflecting the electronic beam by horizontal deflecting plates 31 and vertical deflecting plates 32 receiving the analogue voltages provided by the digital analog converters 25 and 26 via the amplifiers.

The current coordinates X and y of each element of the image are available at the outlets of the adder-subtracters 23 and 24 during the plotting of said element. These coordinates are in digital form, with $n$ bits. They are supplied to a first input of a first comparator 41 which receives the information X and to a first input of a second comparator 42 which receives the information Y.

A dialogue means of known type, shown at 4, such as a "rolling ball" prepares the coordinates of a datum-marked element of the image displayed on the screen of the cathode ray tube 30. Two registers 43 and 44 store the coordinates of X and Y of the marked element, and feeds them continuously to the respective second inputs of the comparators 41 and 42. A marking generator 45 connected to the outputs of the two registers 43 and 44 for storing the coordinates X and Y of the element ensure the generation of a marker, on the screen, coinciding with the element of the image. This marker generator 45 is connected to the beam deflection control signals coming from the processing unit 2, to the beam deflection plates 31 and 32.

The two comparators 41 and 42 detect coincidence between the information received at their respective inputs. They then emit two output pulses applied to an "AND" gate 46, also receiving from a key 47 an enabling signal to search for the designation of the element previously defined by its coordinates by the dialogue means.

A register 48 is connected to the output of the address counter 21 associated with the memory 20. This register 48 has its load input 49 connected to the output of the "AND" gate 46.

During the period of image display, the marking coordinates from the dialogue means are applied continuously to the comparators 41 and 42. The coordinates of the successive elements making up the image coming from the adder-subtracters 23 and 24 are likewise applied to the comparators 41 and 42, Each of these latter emits a pulse at the precise moment when the plotted element is superimposed on the marker. At this instant the address counter 21 of the store is situated at the address of this element. The pulse issuing from the "AND"gate 46 enables the digital value appearing at the outlet of the address counter 21, which is the address of the plotted element, to be extracted and recorded in the register 48 in order to have it available for transmission to the data processor 1, via the transfer member 10.

It will be noted that there is no coincidence in the interval between the moment of one of the plots of the element to be designated by its address during the display of the image and the moment of plotting the marker. The moment the element is superimposed on the marker, the coincidence of their coordinates is detected.

FIG. 2 shows a variant of the previous embodiment of the device for the designation of an element by its address from a dialogue means preparing the coordinates of a datum element (or marker) in analogue form. In this FIG. 2, like elements to those of FIG. 1 are designated by like references. The practical differences reside on the one hand in the fact of using a vector generator 22 consisting of two generators 28 and 29 of coordinates of the element to be plotted, in analogue form, and on the other hand of the fact of using a dialogue means 5, such as a "rolling ball", yielding marker coordinates in analogue form.

In this figure converters of the analogue-digital type, high-speed references 51, 52, 53, 54 are connected respectively to the two outlets of the vector generator 22 and to the two outlets of the "rolling-ball" 5. They provide two pairs of coordinates X and Y, one during the plotting of successive segments of the image, the other prepared from the "ball" and appropriate to the marker. The two registers 43 and 44 record the coordinates X and Y defined by the marker in order to apply them to the comparators 41 and 42. These comparators 41 and 42 also receive the coordinates X and Y evolved during the plotting of the successive elements.

In the embodiment of FIG. 2, the enabling key or button 47 is used to start the loading of registers 43 and 44 which are to receive the marking coordinates in digital form. The "AND" gate 46 now only receives the two outputs of the comparators 41 and 42.

The present invention has been described with reference to two embodiments given by way of example. It will be obvious that various modifications in detail and/or replacements of certain means by other technically equivalent means may be made without departing from the scope of the invention. The same process of detection of the address of an element of the image, by comparison of the current coordinates of successive elements of the image and of stored coordinates prepared by a dialogue means, may be put into effect by using an analogue comparator detecting the coincidence between these pairs of analogue coordinates. However, digital comparison being particularly sensitive to noise and to parasitic oscillation. Digital comparison is much easier to carry out, is cheaper and more precise. Obviously the digital comparator will in practice be equipped with a member defining the precision of the comparison achieved, for example the comparison will not turn on the one bit, or the two bits, of least weight of the two groups of coordinates received, in order to detect the superimposition of one element of the image and of the marker in a definite window.

In the embodiments described, the dialogue means may be of all known types ensuring the preparation of coordinate of a reference element (by a marker) of the image.

I claim

1. A device for designating an element of an image, by the address of the information defining this element, in a display assembly which is controlled by a data processor receiving information that defines the image and which includes a processing unit and a cathode-ray unit having a screen, for converting digital signals received from said processor into suitable voltages for displaying the image; said processing unit including a memory for the image, an address counter for information recorded in said memory, and a vector generator controlled by the latter, said generator producing coordinates of successive elements of the image while refreshed on said screen; the designating device comprising communicating means between an operator and said processor, for furnishing X and Y coordinates of a datum-marked element of the displayed image, first and second comparators receiving respectively, on the one hand, the coordinates defined by said communicating means and, on the other hand, the coordinates from said generator; and a register connected to the output of said address counter and controlled for load by the detection of the simultaneous coincidence of the two pairs of coordinates applied to said comparators.

2. An assembly for displaying information from a data processor on a scanned display screen and having an interface for designating an element of the displayed image, comprising a digital processing unit having a memory for storing the information relating to the image to be displayed, an address counter for the information recorded in said memory, a scan control circuit having outputs for controlling the scanning of said screen in dependence upon the stored information, wherein said interface is operative to produce signals representative of the coordinates of an element designated by an operator, the assembly further comprising comparator means for detecting coincidence between the coordinates and said outputs of the scan control circuit, and a register for storing the address in said address counter at the time when the coincidence is detected by said comparator means.

* * * * *